US009632748B2

(12) United States Patent
Faaborg

(10) Patent No.: US 9,632,748 B2
(45) Date of Patent: Apr. 25, 2017

(54) DEVICE DESIGNATION FOR AUDIO INPUT MONITORING

(71) Applicant: Google Inc., Mountain View, CA (US)

(72) Inventor: Alexander Faaborg, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/445,255

(22) Filed: Jul. 29, 2014

(65) Prior Publication Data

US 2015/0370531 A1 Dec. 24, 2015

Related U.S. Application Data

(60) Provisional application No. 62/016,603, filed on Jun. 24, 2014.

(51) Int. Cl.
G10L 21/00 (2013.01)
G06F 3/16 (2006.01)
G10L 15/22 (2006.01)
G10L 15/28 (2013.01)

(52) U.S. Cl.
CPC .............. G06F 3/167 (2013.01); G10L 15/22 (2013.01); G10L 15/28 (2013.01); G10L 2015/223 (2013.01)

(58) Field of Classification Search
None
See application file for complete search history.

(56) References Cited

U.S. PATENT DOCUMENTS

| 5,625,697 | A | 4/1997 | Bowen et al. |
| 6,038,614 | A * | 3/2000 | Chan ................. G06F 3/14 345/158 |
| 6,069,621 | A * | 5/2000 | Schupak ............... H04N 7/163 348/E7.061 |
| 7,184,960 | B2 | 2/2007 | Deisher et al. |
| 2003/0167335 | A1* | 9/2003 | Alexander ............ H04L 29/06 709/228 |
| 2010/0088100 | A1* | 4/2010 | Lindahl .................. G10L 15/30 704/270.1 |

(Continued)

OTHER PUBLICATIONS

Howard, "Activate Google Now 'listening' via bluetooth headset," Google Product Forums, Jun. 30, 2013, Retrieved from <https://productforums.google.com/forum/print/msg/websearch/-cTsRaVV5F4/jeSHR0tqUqlj> 2 pp.

(Continued)

Primary Examiner — Marcus T Riley
(74) Attorney, Agent, or Firm — Shumaker & Sieffert, P.A.

(57) ABSTRACT

A computing device comprises at least one processor, and at least one module operable by the at least one processor to designate a particular computing device from a plurality of computing devices to process audio input, wherein the computing device comprises a first computing device from the plurality of computing devices. The at least one module may be further operable by the at least one processor to, if the particular computing device is not the first computing device, cease processing of audio input, and if the particular computing device is the first computing device, receive first audio input and process the first audio input to determine whether the first audio input includes a predetermined audio command.

20 Claims, 5 Drawing Sheets

(56) References Cited

U.S. PATENT DOCUMENTS

| | | | |
|---|---|---|---|
| 2011/0257971 A1* | 10/2011 | Morrison | G06K 9/00221 |
| | | | 704/233 |
| 2012/0034904 A1* | 2/2012 | Lebeau | G10L 15/265 |
| | | | 455/414.1 |
| 2013/0091309 A1 | 4/2013 | Bjontegard et al. | |
| 2014/0038669 A1* | 2/2014 | Shimizu | H04L 67/12 |
| | | | 455/556.1 |
| 2015/0370531 A1* | 12/2015 | Faaborg | G06F 3/167 |
| | | | 704/275 |

OTHER PUBLICATIONS

"Issue 34348: Voice input should support Bluetooth microphones," Android Open Source Project—Issue Tracker, Jun. 2013, Retrieved from <https://code.google.com/p/android/issues/detail?id=34348> 8 pp.

LeFebvre, "Tell Siri Which Audio Input to Listen to [iOS Tips]," Cult of Mac, May 14, 2013, Retrieved from <http://www.cultofmac.com/227210/tell-siri-which-audio-input-to-listen-to-ios-tips/> 8 pp.

International Search Report and Written Opinion from counterpart International Application No. PCT/US2015/036961, dated Oct. 30, 2015, 10 pp.

"Exclusive: Google Will Soon Introduce 'Nearby' to Let other 'People, Places, and Things' Know When You're Around," Jun. 6, 2014, Retrieved from http://www.androidpolice.com/2014/06/06/exclusive-google-will-soon-introduce-nearby-to-let-other-people-places-and-things-know-when-youre-around/. 10 pp.

"Use Nearby to interact with what's around you- Accounts Help," Retrieved on Oct. 5, 2016 from https://support.oogle.com/accounts/answer/62602867hl=en, 5 pp.

U.S. Appl. No. 15/355,336, by Jian Wei Leong, filed Nov. 18, 2016.

\* cited by examiner

DEVICE DESIGNATION FOR AUDIO INPUT MONITORING

This application claims the benefit of U.S. Provisional Application No. 62/016,603, filed Jun. 24, 2014, the entire content of which is hereby incorporated by reference.

BACKGROUND

Computing devices (e.g., mobile phones, tablet computers, etc.) may enable a user to provide audio input. The audio input may cause the computing device to perform one or more actions associated with the received audio input, such as executing an application or creating a calendar appointment entry. In some cases, a computing device may monitor an environment for audio input that includes a predetermined audio command and, if the predetermined audio command is detected, perform a corresponding action. By monitoring for audio input that includes a predetermined audio command, a computing device may allow a user to provide, subsequent to providing the audio input that includes the predetermined audio command, one or more other audio commands without the user having to press a button or otherwise indicate that an audio command is about to be provided. In some situations, two or more computing devices associated with the user may monitor the same environment for audio input, possibly resulting in each of the computing devices performing actions based on predetermined audio input.

SUMMARY

In one example, a method includes designating, by a first computing device from a plurality of computing devices, a particular computing device from the plurality of computing devices to process audio input. The method may further include, if the particular computing device is not the first computing device, ceasing, by the first computing device, processing of audio input; and if the particular computing device is the first computing device: receiving, by the first computing device, first audio input, and processing, by the first computing device, the first audio input to determine whether the first audio input includes a predetermined audio command.

In another example, a computing device includes at least one processor and at least one module operable by the at least one processor to designate a particular computing device from a plurality of computing devices to process audio input, wherein the computing device comprises a first computing device from the plurality of computing devices. The at least one module may be further operable by the at least one processor to, if the particular computing device is not the first computing device, cease processing of audio input, and if the particular computing device is the first computing device, receive first audio input and process the first audio input to determine whether the first audio input includes a predetermined audio command.

In another example, a computer-readable storage medium is encoded with instructions that, when executed, cause at least one processor of a first computing device to receive, from a second computing device, a designation of a particular computing device from a plurality of computing devices to process audio input. The computer-readable storage medium may be further encoded with instructions that, when executed, cause the at least one processor of the computing device to, if the particular computing device is not the first computing device, cease processing of audio input, and if the particular computing device is the first computing device, receive first audio input and process the first audio input to determine whether the first audio input includes a predetermined audio command.

The details of one or more examples are set forth in the accompanying drawings and the description below. Other features, objects, and advantages will be apparent from the description and drawings, and from the claims.

DETAILED DESCRIPTION

In general, techniques of the present disclosure may enable one or more computing devices from among a plurality of computing devices to designate a particular computing device to monitor for and/or act on audio input usable to initiate interaction with at least one of the plurality of computing devices. For instance, a plurality of computing devices (e.g., a smartphone, a smartwatch, and an in-vehicle entertainment/navigation system) may each be operable to monitor for and/or act on audio input that includes one or more predetermined audio commands. One or more of the computing devices (e.g., the smartphone, the smartphone and the smartwatch, etc.) may use techniques described herein to designate a particular computing device (e.g., an in-vehicle system) from among the plurality of computing devices as the best candidate for monitoring environmental audio for audio input that includes the one or more predetermined audio commands. Responsive to designating a particular computing device to monitor for the one or more predetermined audio inputs, other computing devices from the plurality of computing devices (e.g., the smartphone and smartwatch) may temporarily cease to monitor for audio input. Thereafter, the particular device may be the only one of the plurality of computing devices monitoring for audio input and, in some instances, upon receiving an indication of audio input that includes a predetermined audio command, the particular device may be the only one of the plurality of computing devices to perform one or more actions responsive thereto.

By designating a particular computing device to monitor for audio input and/or process indications of the audio input (e.g., monitor for one or more predetermined audio commands, such as "hotwords" or "audio triggers") and sending instructions to the other, non-designated computing devices to temporarily cease monitoring for audio input, computing devices and/or systems employing the techniques described herein may increase computational efficiency (by, e.g., avoiding redundant processing, avoiding parallel-processing hazards of operating on the same data, and/or improving device battery life). That is, when more than one computing device is operable to monitor for and/or act on audio input that includes a predetermined audio command, designating a single device to do so may ensure that a single device expends energy in the process, and that a single device performs actions responsive to the receipt of predetermined audio command.

Figure 1:
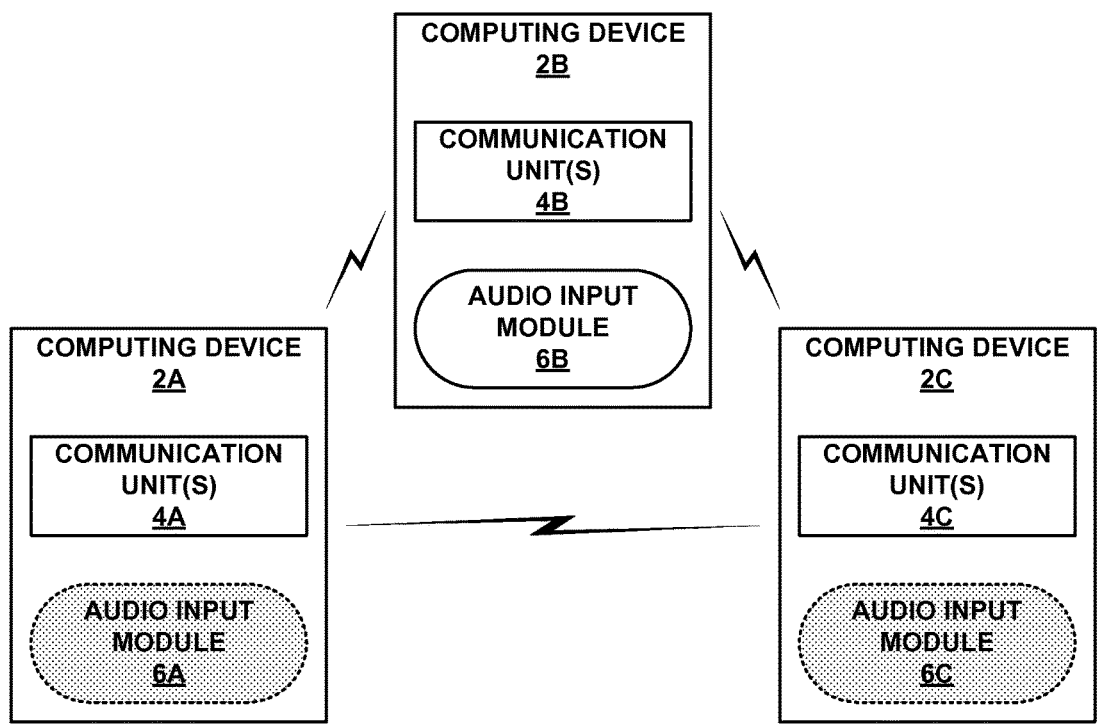
FIG. 1 is a conceptual diagram illustrating an example computing environment that includes a plurality of computing devices configured to process audio input, in accordance with one or more techniques of the present disclosure.

FIG. 1 is a conceptual diagram illustrating an example computing environment 1 that includes a plurality of computing devices 2A-2C (collectively, "computing devices 2") configured to process audio input, in accordance with one or more techniques of the present disclosure. Examples of computing devices 2 may include, but are not limited to, portable, mobile, or other devices, such as mobile phones (including smartphones), wearable computing devices (e.g., smartwatches, head-mounted devices, etc.), personal digital assistants (PDAs), in-vehicle devices (e.g., stereo systems, navigation systems, etc.), tablet computers, smart television platforms, laptop computers, desktop computers, server computers, mainframes, and the like. For instance, in the example of FIG. 1, computing device 2A may be a smartphone, computing device 2B may be an in-vehicle stereo/navigation system, and computing device 2C may be a smartwatch. In other examples, computing devices 2 may include additional computing devices, different computing devices, or fewer computing devices. That is, while described in the example of FIG. 1 with reference to three computing devices, computing devices 2 may include two computing devices, four computing devices, or more computing devices of various types.

Computing devices 2, as shown in the example of FIG. 1, include respective communication units 4A-4C (collectively, "communication units 4"). Each of communication units 4 may be operable to communicate with external devices via one or more wired and/or wireless networks by transmitting and/or receiving network signals on the one or more networks. Examples of communication units 4 include a network interface card (e.g. such as an Ethernet card), an optical transceiver, a radio frequency transceiver, a GPS receiver, or any other type of device that can send and/or receive information. Additional examples of communication units 4 may include Near-Field Communications (NFC) units, Bluetooth radios, short wave radios, cellular data radios, wireless network (WiFi) radios, infrared communication ports, as well as universal serial bus (USB) controllers. In other words, each of communication units 4 may be means by which the respective one of computing devices 2 may communicate with any other device, such as with each other.

In the example of FIG. 1, computing devices 2 include respective audio input modules 6A-6C (collectively, "audio input modules 6"). Each of audio input modules 4 may be operable to monitor the environment of the respective computing device for audio input and process the audio input to determine whether the audio input includes a predetermined audio command. The environment of a computing device may represent the real-world area immediately surrounding the computing device (e.g., within 1 meter of the computing device, within 5 meters of the computing device, within the same room as the computing device, or other designated area). A predetermined audio command, generally, may be any audio input (e.g., a word, a phrase, etc.) that that is usable to initiate interaction with a computing device. In other words, predetermined audio commands may be specific audio input for which a computing device may monitor environmental audio and that a user may use without having to otherwise inform the computing device that he or she is about to provide audio input.

One or more of audio input modules 6 may associate a predetermined audio command with an action to be performed by the respective computing device. For instance, one or more of audio input modules 6 may associate a word or phrase (e.g., "Hello phone," "Okay car," etc.) with entering an audio input mode, thereby allowing the user to provide further audio input. Other examples of predetermined audio inputs and associated actions may include a word or phrase (e.g., "answer") that causes a computing device to answer a telephone call, a word or phrase (e.g., "navigation," "directions," etc.) that causes a computing device to provide directions, a word or phrase (e.g., "send email," "send text message," etc.) that causes a computing device to send a message, and others. In some examples, predetermined audio commands may be user-configurable. That is, a user may create, modify, enable, disable, or discard various predetermined audio commands. In some examples, which predetermined audio commands a computing device is configured to act on may be determined (e.g., by the computing device) based on a number of other criteria, such as the applications installed at the computing device, the applications executing at the computing device, the time of day, or other criteria.

Before monitoring for audio input, each of audio input modules 4 may require permission from a user of the respective one of computing devices 2. That is, each of audio input modules 4 may perform operations to obtain permission from a user prior to monitoring the environment around the respective computing device for audio input and/or processing the audio input to determine whether the audio input includes a predetermined audio command. For instance, audio input module 4A may cause computing device 2A to output a prompt to the user, asking for permission to monitor audio from the environment of computing device 2A. Audio input module 4A may only monitor for audio input in response to receiving confirmation from the user. In some examples, permission to monitor environmental audio may be transient or situation specific. In other examples, permission may be more persistent. That is, in various examples, a user may grant permission to monitor environmental audio for a short duration of time, for a long duration of time, only in specific situations, and/or until the user revokes permission.

Generally, responsive to receiving permission from a user, an audio input module may monitor for audio input by obtaining audio (e.g., via a microphone or other audio sensor) from the environment around the respective computing device and processing obtained audio input to determine whether a predetermined audio command is included in the audio input. For instance, audio input modules may be operable to utilize speech recognition techniques to determine text from obtained audio input, and compare the text to a set of predetermined audio commands (e.g., stored at the respective computing device or other location) to determine whether the obtained audio input includes a predetermined audio command.

When operating independent from one another, computing devices 2 may all monitor environmental audio for audio input that includes a predetermined audio command. That is, in some examples, computing devices 2 may not be communicating with one another or otherwise associated with one another in any way and, consequently, each of audio input modules 4 may be monitoring the environment of the respective computing device for audio input that includes predetermined audio commands. If each of audio input modules 4 is monitoring a different environment, then audio input received by one of computing devices 2 may not be received by another of computing devices 2. For instance, a user may be wearing computing device 2C (the smartwatch) while in his or her kitchen. Computing device 2A (the smartphone) may be in the user's bedroom and computing device 2B (the in-vehicle stereo/navigation system) may be in the user's garage. In such instance, computing device 2C may receive audio input that includes a predetermined audio command (e.g., "Hello device") while computing devices 2A and 2B each receive audio input that does not include a predetermined audio command. Consequently, only computing device 2C may perform a corresponding action (e.g., entering an audio input mode) because only computing device 2C was monitoring the environment in which the predetermined audio command was used (e.g., the kitchen).

If, however, two or more of computing devices 2 are monitoring the same environment, then audio input received by one of computing devices 2 may be received by one or more others of computing devices 2. In such instance, two or more of computing devices 2 may each process the audio input to determine whether the audio input includes a predetermined audio command. The two or more computing devices may each determine that the audio input includes a predetermined audio command and may each perform the corresponding action. Two or more computing devices monitoring the same environment for audio input that includes a predetermined audio command may waste processing power and/or battery life through duplicative monitoring of environmental audio as well as through duplicative processing of received audio input.

Furthermore, two or more computing devices performing the same action may, in some examples, give rise to parallel-processing concerns. For instance, if two computing devices receive the predetermined audio command "Hello device," both computing devices may, in some examples, enter an audio input mode. Thereafter, any audio command included in audio input (e.g., "Play Song 1") may be received by both computing devices. In order to perform the corresponding action, both computing devices may attempt to access a "Song 1" audio file (e.g., located at a remote location) at nearly the same time. In some examples, one computing device may begin playing "Song 1" while the other returns an error. In other examples, both computing devices may begin playing "Song 1." In yet other examples, both computing devices may return an error. Other examples of parallel-processing concerns may include two or more computing devices attempting to place a phone call, two or more computing devices attempting to create or modify a calendar entry, or otherwise create, access, modify, or delete the same data. Monitoring an environment for audio input including predetermined audio commands by only a single computing device may reduce wasted energy, avoid parallel-processing problems, and overall improve the user experience.

In the example of FIG. 1, each of computing devices 2 may be associated with one another. For instance, computing devices 2 may be associated with one another based on the fact that each of computing devices 2 is associated with the same user. As another example, computing devices 2 may be associated with one another based on established communications links between computing devices 2 via one or more wireless or wired (e.g., physical) links. In some examples, the connections may be established and/or maintained by communication units 4. For instance, in the example of FIG. 1, computing devices 2 may be paired or grouped through short-range communication such as the Bluetooth protocol or the Bluetooth Low Energy (BLE) protocol. In other examples, computing devices 2 may be paired, grouped, or otherwise communicatively connected to one another using another protocol. Other examples of wired or wireless connections linking two or more of computing devices 2 may include one or more connections formed via a packet-based network connection (e.g., TCP/IP, etc.) or any other means of communicating data. In some examples, each connection may function independently. For instance, computing device 2A may communicate with computing device 2B via a first connection and communicate with computing device 2C via a second connection. In some examples, all of computing devices 2 may communicate via one or more shared connections. For instance, computing devices 2 may each communicate with each other via a bus structure, a token ring structure, a star network structure, or any other structure for shared communication among two or more devices.

In some examples, when computing devices 2 are associated with one another, computing devices 2 may determine whether or not they are in physical proximity of one another. That is, one or more of computing devices 2 may determine whether computing devices 2 are close to one another. In the example of FIG. 1, for instance, in which computing devices 2 are connected via short-range communication, computing devices 2 may determine physical proximity based on the signal strength of the short-range communications. In the example of FIG. 1, the user may be wearing computing device 2C (the smartwatch) while driving in his or her car (the in-vehicle stereo/navigation system) with computing device 2A (the smartphone) in his or her pocket. Consequently, computing devices 2 may determine that each of computing devices 2 is physically proximate to the others.

In some examples, computing devices 2 may determine physical proximity based additionally or alternatively on physical location. That is, each of computing devices 2 may include a module to determine a physical location of the respective computing device (e.g., via GPS or other means) and computing devices 2 may determine that two devices are physically proximate when the two computing devices' physical locations are substantially the same (e.g., within 5 meters of one another, within 50 meters of one another, or within some other distance). In some examples, computing devices 2 may determine physical proximity by additionally or alternatively communicating via links 8. For instance, computing devices 2 may compare audio input received from the environment and, if the audio input is determined to be substantially the same, computing devices 2 may determine that they are physically proximate to one another. In some examples, computing devices 2 may determine physical proximity based additionally or alternatively on other criteria, such as the existence or non-existence of one or more wireless networks, one or more inputs received from a user, or other criteria. In some examples, computing devices 2 may perform the techniques of the present disclosure without determining physical proximity.

In accordance with the techniques described herein, one or more computing devices from a plurality of computing devices may designate a particular computing device from among the plurality of computing devices to process audio input to determine whether the audio input includes a predetermined audio command. In the example of FIG. 1, for instance, one or more of computing devices 2 (e.g., computing device 2A, computing device 2A and computing device 2B, etc.) may designate a particular one of computing devices 2 (e.g., computing device 2B) to monitor for audio input and/or process the audio input to determine whether the audio input includes a predetermined audio command. That is, computing devices 2 may designate audio input module 6B of computing device 2B to monitor environmental audio for predetermined audio commands. The designation of computing device 2B may reflect the fact that, when travelling in a vehicle, an in-vehicle stereo/navigation system may provide better microphone placement and audio reception characteristics for voice recognition than a smartphone or a smartwatch. That is, while travelling in a vehicle, it may be likely that the user's wrist will be near the steering wheel and away from the user's mouth. Furthermore, while a user's smartphone may be sufficiently placed to receive environmental audio, it may be likely that the in-vehicle navigation system is better configured to monitor audio in the vehicle and process audio input to determine whether the audio input includes a predetermined audio command, as the system may be designed to account for road noise, echo, and other characteristics unique to the in-vehicle experience.

In some examples, designation of a particular computing device to monitor for and/or process audio input may be performed by a single computing device. For instance, computing device 2A (the smartphone) may make the designation alone. In other examples, designation of a particular computing device to monitor for and/or process audio input may be jointly performed by two or more of computing devices 2. For instance, computing devices 2 may perform an arbitration process among themselves to determine which of computing devices 2 should be designated as the particular computing device. In some examples, each of computing devices 2 may independently determine which of computing devices 2 should be designated as the particular computing device to monitor for and/or process audio input.

In various examples, one or more of computing devices 2 may designate a particular computing device to monitor for and/or process audio input based on various criteria. In some examples, designation of the particular computing device may be based on a configured hierarchy of device types (e.g., "smartphone," "smartwatch," "headset," "tablet," "laptop," "desktop," "in-vehicle system," etc.). For instance, one or more of computing devices 2 may be configured with a ranked list of device types that indicates respective priorities of various device types usable to monitor for and/or process audio input. Each of computing devices 2 may communicate (e.g., using communication units 4) an indication of its respective device type to others of computing devices 2. The one or more of computing devices 2 may designate, as the particular computing device, the computing device that is of a device type that ranks highest on the list. For instance, if each of computing devices 2 is configured with the ranked list, then each respective computing device may send a respective device type and receive device types of the other computing devices. Each respective computing device may determine whether or not the respective computing device is of the device type that ranks highest on the list. If the respective computing device is of the device type that ranks highest on the list, the respective computing device may designate itself to monitor for and/or process audio input. If the respective computing device is not of the device type that ranks highest, the respective computing device may not designate itself.

In some examples, one or more of computing devices 2 may designate the particular computing device to monitor for and/or process audio input based additionally or alternatively on a level of audio input quality associated with one or more of computing devices 2. For instance, one or more of computing devices 2 may obtain audio input from the environment (e.g., via respective ones of audio input modules 6) and communicate with others of computing devices 2 to compare the quality of the audio input and/or of speech included therein. Computing devices 2 may determine and/or compare audio input quality using various quantifiers, such as volume, signal-to-noise ratio, and/or or other parameters. The one or more of computing devices 2 may designate the computing device having the highest level of audio input quality as the particular computing device to monitor for and/or process audio input.

In some examples, one or more of computing devices 2 may designate the particular computing device to monitor for and/or process audio input based additionally or alternatively on the number of predetermined audio commands that each of computing devices 2 may be operable to act on. That is, in some examples, the one or more of computing devices 2 may designate the computing device configured with the largest number of predetermined audio commands as the particular computing device. This may reflect the fact that it may be more likely that the user will be causing the computing device configured with the largest number of predetermined audio commands to perform an action.

In some examples, one or more of computing devices 2 may designate the particular computing device to monitor for and/or process audio input based additionally or alternatively on a determined context of one or more of computing devices 2. The context of a computing device may be made up of any number of items of contextual information. Example items of contextual information may include collections of data (e.g., a text data structure, a numeric data structure, or other data structure) that represents a location of the computing device (e.g., a GPS location); information indicating a time as determined by the computing device; information indicating one or more applications installed at the computing device; information indicating one or more applications currently executing at the computing device; information indicating one or more networks (e.g., wireless networks) available to the computing device; data that represents one or more other computing devices in proximity to the computing device (e.g., within 10 feet, within 100 feet, or other distance); data that represents an operating mode (e.g., silent mode, airplane mode, driving mode, standby mode, low battery mode, or any other mode of operation) of the computing device, data obtained from one or more sensors of the computing device (e.g., temperature data, ambient noise level data, light level data, acceleration/movement data, image/video data, and other data), or any other data about the status or current state of the computing device.

In some examples, an item of contextual information may additionally or alternatively be data representing information about a user of the computing device, such as a name of the user, a user identification (UID) of the user, information from one or more social media network service accounts associated with the user, information from one or more calendars or scheduling applications associated with the user, information indicating one or more social or professional relationships of the user (e.g., user contacts), or any other information about the user.

As one example of designating the particular computing device to monitor for and/or process audio input based on context, one of computing devices 2 (e.g., computing device 2A) may determine an item of contextual information indicating that computing device 2A is at a particular location and an item of contextual information indicating that the user's workplace corresponds to the particular location. Based at least in part on the determined context of computing device 2A, one or more of computing devices 2 may designate computing device 2C as the particular computing device to monitor for and process audio input. This may reflect the fact that, while a user is at work, he or she is unlikely to be near his or her vehicle. Furthermore, while at work, the user may want to speak softly and avoid holding his or her smartphone next to his or her face in order to avoid attracting attention. That is, a smartwatch may be the device closest to the user's mouth when the user is providing audio input, and thus computing devices 2 may, based on the determined context of computing device 2A, designate computing device 2C as the particular computing device to monitor for and process audio input.

Responsive to designating the particular computing device to monitor for and/or process audio input, the techniques of the present disclosure may include temporarily deactivating, for each respective computing device from the plurality of computing devices other than the particular computing device, the respective module included in the respective computing device. In the example of FIG. 1, for instance, because computing device 2B was designated as the particular computing device to monitor for and/or process audio input, audio input modules 6A and 6C may be temporarily deactivated while audio input module 6B remains active. This is illustrated in the example of FIG. 1 by showing audio input modules 6A and 6C as shaded elements having dotted lines, while audio input module 6B remains solid and unshaded. In some examples, the same computing device or devices that designate the particular computing device may temporarily deactivate the audio input modules that are included in computing devices other than the particular computing device. In some examples, the designated particular computing device may output instructions to computing devices other than the particular computing device to cause the respective computing devices other than the particular computing device to temporarily deactivate respective audio input modules. In some examples, each computing device other than the particular computing device may temporarily deactivate its own audio input module based on the designation. In other words, those of audio input modules 6 included in one of computing devices 2 other than the designated computing device (e.g., computing device 2B) may be temporarily deactivated by one or more of computing devices 2. That is, computing devices 2 may temporarily cease monitoring for and/or processing audio input. The deactivation may be temporary in that computing devices 2 may resume monitoring for and/or processing audio input at a later time (e.g., after a specified duration of time has passed, upon receiving an indication from another computing device, upon determining that none of the other of computing devices 2 are in proximity, or based on one or more other criteria).

The techniques of the present disclosure may include receiving, by the particular computing device, audio input. In the example of FIG. 1, for instance, audio input module 6B may continue to monitor the environment of computing device 2B for audio input. The user may speak a predetermined audio command (e.g., "Give me directions"). Audio input module 6B may receive the audio input (e.g., from a microphone or other audio input device) that includes the predetermined audio command. Audio input modules 6A and 6B may remain deactivated and thus not receive the audio input that includes the predetermined audio command.

In accordance with the techniques described herein, the particular computing device may process the audio input to determine whether the audio input includes a predetermined audio command. In the example of FIG. 1, audio input module 6B may process the received audio input and determine that the audio input includes the predetermined audio command, "Give me directions." Because audio input modules 6A and 6C are temporarily deactivated, neither audio input module 6A nor audio input module 6C may waste processing power and/or battery power to monitor for audio input and/or process the audio input.

In this way, the techniques of the present disclosure may enable a plurality of computing devices to more efficiently monitor for audio input and/or process received audio input to identify predetermined audio commands included in the audio input. By designating a particular computing device to monitor for and/or process audio input and temporarily ceasing monitoring and/or processing by the other computing devices, the techniques described herein may reduce wasted energy (e.g., battery power) and avoid potential parallel-processing issues. Furthermore, by designating the particular computing device to monitor for audio input and/or process audio input based on various criteria, the techniques of this disclosure may improve the user experience by improving speech recognition in various instances.

Figure 2:
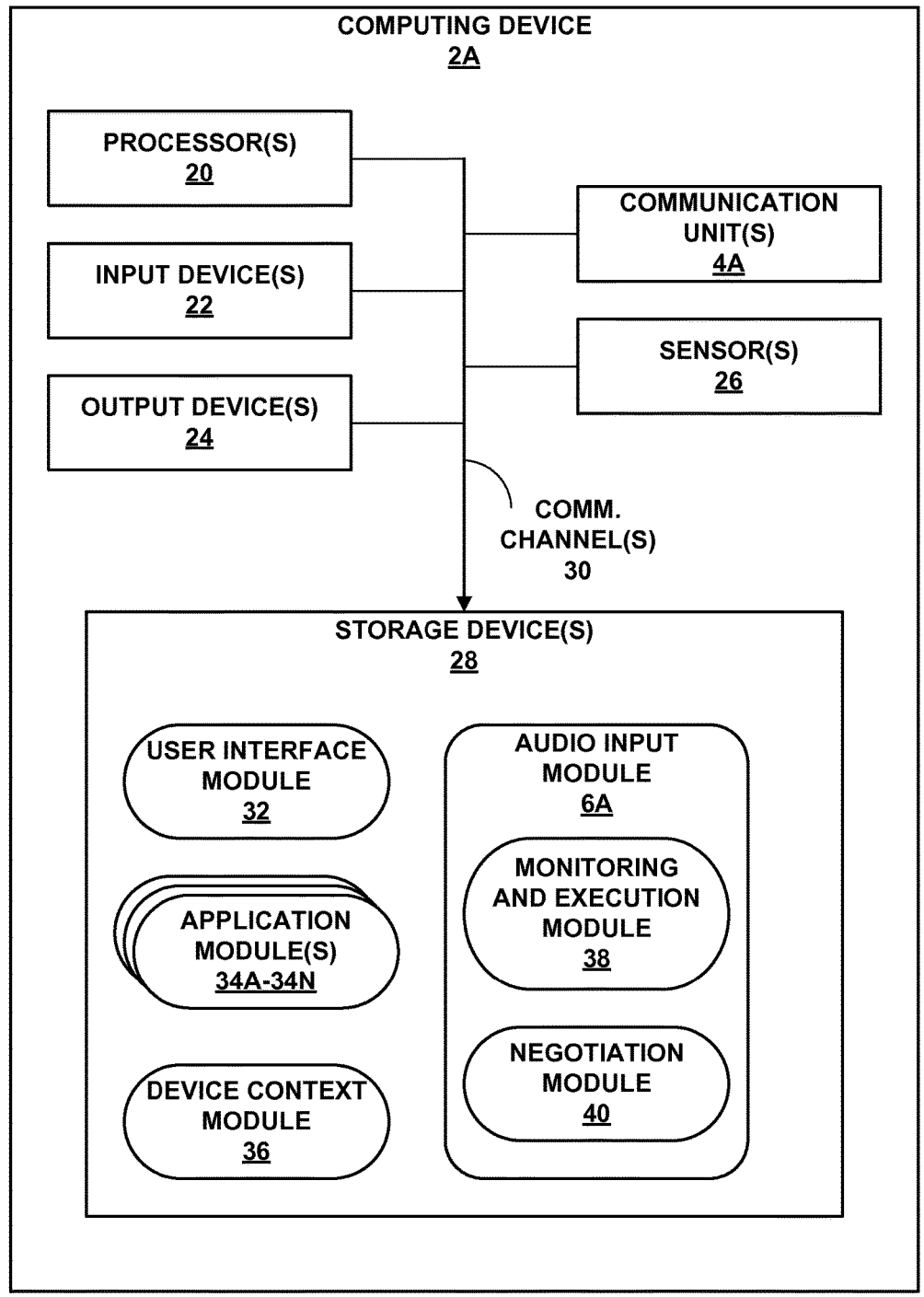
FIG. 2 is a conceptual diagram illustrating details of one example of a computing device configured to process audio input, in accordance with one or more techniques of the present disclosure.

FIG. 2 is a conceptual diagram illustrating details of one example of computing device 2A configured to process audio input, in accordance with one or more techniques of the present disclosure. The example of FIG. 2 is described below within the context of FIG. 1. FIG. 2 illustrates only one particular example of computing device 2A, and many other examples of computing device 2A may be used in other instances. In some examples, computing device 2A may include fewer components than shown in the example of FIG. 2 or additional components not shown in the example of FIG. 2.

As shown in the example of FIG. 2, computing device 2A includes one or more processors 20, one or more input devices 22, and one or more output devices 24. Computing device 2 also includes one or more communication units 4A, one or more sensors 26, and one or more storage devices 28. Storage devices 28 include user interface (UI) module 32, device context module 36, application modules 34A-34N (collectively, "application modules 34"), and audio input module 6A. Audio input module 6A, in turn, includes monitoring and execution module 38 and negotiation module 40. Communication units 4A may have the same or similar functionality as that previously described with respect to FIG. 1.

Communication channels (COMM. CHANNELS) 30 may interconnect components 4A, 6A, 20, 22, 24, 26, 28, 32, 34, 36, 38, and/or 40 for inter-component communications (physically, communicatively, and/or operatively). In some examples, communication channels 30 may include a system bus, a network connection, an inter-process communication data structure, or any other method for communicating data.

One or more processors 20 may, in the example of FIG. 2, implement functionality and/or execute instructions within computing device 2A. For example, processors 20 may receive and execute instructions stored by storage devices 28 that implement the functionality of modules 6A, 32, 34, 36, 38, and/or 40. These instructions, executed by processors 20, may cause computing device 2A to read/write/etc. information stored within storage devices 28 during program execution. Processors 20 may execute instructions of modules 6A, 32, 34, 36, 38, and/or 40 to cause computing device 2A to (by itself or in association with other computing devices) designate a particular computing device to monitor for and/or process audio input, receive audio input, process the audio input to determine whether the audio input includes a predetermined audio command, temporarily cease monitoring for and/or processing audio input, and/or perform other actions. That is, modules 6A, 32, 34, 36, 38, and/or 40 may be operable by processors 20 to perform various actions or functions of computing device 2A.

In the example of FIG. 2, one or more input devices 22 may be operable to receive input. Examples of input are tactile, audio, and video input. Input devices 22, in one example, include a presence-sensitive or touch-sensitive display, a mouse, a keyboard, a voice responsive system, a video camera, a microphone or other audio sensor, or any other type of device for detecting input from a human or machine. For instance, input devices 22 may be or may include a microphone, or other audio sensors operable to receive audio input from the environment around computing device 2A.

In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to output devices 24.

One or more output devices 24 may, in the example of FIG. 2, be operable to generate output. Examples of output are tactile, audio, and video output. Output devices 24, in one example, include a presence-sensitive display, sound card, speaker, video graphics adapter card, speaker, cathode ray tube (CRT) monitor, liquid crystal display (LCD), or any other type of device for generating output to a human or to a machine.

While illustrated as internal components of computing device 2A, one or more of input devices 22 and/or output devices 24 may also represent external components that share a data path with computing device 2A for transmitting and/or receiving input and output. That is, in some examples, input devices 22 and/or output devices 24 may represent built-in components of computing device 2A, located within and physically connected to the external packaging of computing device 2A (e.g., a screen on a mobile phone). In another example, input devices 22 and/or output devices 24 may represent external components of computing device 2A, located outside and physically separate from the packaging of computing device 2A (e.g., a monitor, a projector, or other display device that shares a wired and/or wireless data path with a tablet computer).

In the example of FIG. 2, one or more sensors 26 may be operable to generate data for use by components of computing device 2A. Sensors 26 may include any device or component capable of obtaining data about computing device 2A, data about an environment in which computing device 2A is situated, data about a user of computing device 2A, or other data. In some examples, sensors 26 may obtain data providing contextual information regarding computing device 2A, such as one or more of temperature data, ambient noise level data, light level data, acceleration/movement data, or image/video data, for example. Any of sensors 26 may be hardware, firmware, software, or a combination thereof for obtaining information. Examples of sensors 26 may include a GPS sensor, a position sensor, an accelerometer or other motion sensor, a camera, a compass, a magnetometer, a light sensor, an infrared sensor, a microphone or other audio sensor, a radiation sensor, a temperature sensor, a barometer, an altimeter, or other data gathering components.

One or more storage devices 28 may, in the example of FIG. 2, be operable to store information for processing during operation of computing device 2A. For instance, computing device 2A may store data that modules 6A, 32, 36, and/or 34 may access during execution at computing device 2A. In some examples, storage devices 28 represent temporary memories, meaning that a primary purpose of storage devices 28 is not long-term storage. For instance, storage devices 28 of computing device 2A may be volatile memory, meaning that storage devices 28 may not retain stored contents if powered off. Examples of volatile memories include random access memories (RAM), dynamic random access memories (DRAM), static random access memories (SRAM), and other forms of volatile memories known in the art.

Storage devices 28, in some examples, also include one or more computer-readable storage media. Storage devices 28 may be configured to store larger amounts of information than volatile memory. Storage devices 28 may further be configured for long-term storage of information. In some examples, storage devices 28 include non-volatile storage elements, meaning that storage devices 28 may maintain information through power on/power off cycles. Examples of non-volatile memories include magnetic hard discs, optical discs, floppy discs, flash memories, or forms of electrically programmable memories (EPROM) or electrically erasable and programmable (EEPROM) memories. Storage devices 28 may, in some examples, store program instructions and/or information (e.g., data) associated with modules 6A, 32, 34, 36, 38, and/or 40, such as during program execution.

UI module 32 may, in the example of FIG. 2, may be operable by processors 20 to perform one or more functions, such as receive input (e.g., from input devices 22) and send indications of such input to other components associated with computing device 2A, such as application modules 34. UI module 32 may also receive data from components associated with computing device 2A such as modules 6A and/or 34. Using the data received, UI module 32 may cause other components associated with computing device 2A, such as output devices 24, to provide output based on the data. For instance, UI module 32 may receive data from one of application modules 34 to display a GUI at one of output devices 24.

Application modules 8, as shown in the example of FIG. 1, may include functionality to perform any variety of operations on computing device 2. For instance, application modules 8 may include a word processor application, an email application, a web browser application, a multimedia player application, an alarm clock application, a calendar application, an operating system, a distributed computing application, a graphic design application, a video editing application, a web development application, a navigation or mapping application, or any other application.

Device context module 36 may, in the example of FIG. 2, be operable by processors 20 to perform operations to determine a current context of computing device 2A. That is, if given permission by the user of computing device 2A, device context module 36 may be operable to obtain information from other components of computing device 2A (e.g., application modules 34, communications units 4A, sensors 26, etc.) and/or from other computing devices in order to determine a current context that describes computing device 2A, the environment in which computing device 2A is situated, the activities in which computing device 2A is current engaged, a user of computing device 2A, the activities in which the user of computing device 2A is currently engaged, and/or other information.

As one example, device context module 36 may communicate with input devices 22, and/or UI module 32 to obtain information indicating whether or not the user is interacting with computing device 2A. Device context module 36 may communicate with one of communication units 4A (e.g., a Bluetooth radio) and obtain information indicating whether or not one or more other computing devices are proximate to computing device 2A. Device context module 36 may communicate with one or more of sensors 26 to obtain information about the physical environment in which computing device 2A exists (e.g., a light level, an ambient noise level, a temperature level, a humidity level, a location, etc.). In some examples, device context module 36 may not communicate directly with sensors 26. In some examples, device context module 36 may obtain data from modules of computing device 2A (not shown) that process sensor data received from sensors 26.

As another example, device context module 36 may communicate with one or more of application modules 34 to obtain an indication of which (if any) application modules are executing at computing device 2A, obtain an indication of any application that is currently being used by the user (e.g., which applications are being displayed at output devices 24 or are "in focus"), and/or an indication of an activity such application is performing. For instance, device context module 36 may obtain data indicating that application 34A (e.g., an audio player application) and application 34B (e.g., an email client application) are currently executing at computing device 2A, application 34B is currently in focus, and application 34A is currently playing an audio track while application 34B is providing an email-drafting user interface. Other example activities which an application may be performing include playing a game, browsing a website, searching for information, booking travel reservations, or other activities. In some examples, device context module 36 may obtain information relating to the activity that an application is performing, such as a recipient or sender of an email being composed or read, a user name or level for a game being played, a title or artist name for a song being played, a website URL being viewed, a search query being executed, or other details.

As yet other examples of information that device context module 36 may use to determine the current context, device context module 36 may communicate with application modules 34 and/or communication units 6A to determine contextual information regarding the user of computing device 2A. For instance, device context module 36 may obtain information from an email application regarding social media network services that the user is a member of, email lists that the user subscribes to, or other information. Device context module 36 may also obtain information from a calendar application regarding appointments the user may have. Device context module 36 may communicate with communication units 6A to obtain information from one or more other computing devices or systems. For instance, if permission is received from the user, device context module 36 may cause communication units 6A to obtain information from a social media network service account of the user, an email account of the user, or other sources of information.

Based on the obtained items of contextual information, device context module 36 may determine a current context. As one example, device context module 36 may determine a current context by determining values for one or more contextual categories, as well as a respective weight for each category. That is, device context module 36 may determine values based on obtained information and weigh each category based on a predicted accuracy and/or a predicted importance of the associated value. For instance, contextual categories may indicate a type and/or a name of an application being executed at computing device 2A, a location of computing device 2A, an indication of a computing device or computing devices that are proximate to computing device 2A, an activity or task in which computing device 2A is currently engaging or in which an application executing at computing device 2A is engaging, a time of day or current time, a user identification number for a user of computing device 2A, a predicted activity or task in which the user is engaging, a predicted mode of travel of the user, a predicted current availability of the user, or various other information.

A weighting applied to a contextual category may indicate an importance of the value that was determined for the category. For example, weightings may be defined on a scale (e.g., 0-10, 1-100, or other scale). If a value for a category is predicted to be an important part of the current context and/or determined as very likely to be true, then the category may receive a heavy weight, toward one end of the scale (e.g., 90 out of 100). If a value for a category is not predicted to be very important and/or is determined to include uncertainty, then the category may receive a lighter weight, at the other end of the scale (e.g., 10 out of 100). In this way, device context module 36 may prioritize some information over other information when determining the current context.

In the example of FIG. 2, device context module 36 may determine a value for a current-location category. For instance, based on information (e.g., obtained from a GPS location sensor included in sensors 26) indicating that computing device 2A is regularly located at a specified location during nighttime hours and that computing device 2A is currently located at the same specified location, as well as information (e.g., obtained from contact information for the user or from an email application of the user) indicating that the user's home address is geographically located in substantially the same specified location, device context module 36 may determine the value "Home" for the current-location category.

Device context module 36 may determine a corresponding weight for the current-location category. In the example of FIG. 2, device context module 36 may determine a relatively heavy weight, as the location information (e.g., based off of GPS data) is relatively accurate, and there are multiple pieces of information indicating the same result (e.g., that computing device 2A is at the home of the user). In other examples, such as where location information is based on other, less-accurate data (e.g., only a time of day and previous location data), the value for the current-location category may be weighted less heavily.

Device context module 36 may, in the example of FIG. 2, also determine a value for a movement category that indicates whether or not computing device 2A is moving. For instance, based on information obtained from an accelerometer (e.g., one of sensors 26) and/or others inputs, device context module 36 may determine the value for the movement category as "None." That is, device context module 36 may determine that computing device 2A is not currently moving. Device context module 36 may assign a heavy weight to the movement category, as this information is unlikely to be incorrect (e.g., because the information is obtained directly from sensors 26 of computing device 2A).

In various examples, device context module 36 may determine values and weights for additional contextual categories or alternative contextual categories. In any case, after determining the current context, device context module 36 may provide at least an indication of the current context to audio input module 6A. For instance, device context module 36 may send data indicating each contextual category, the associated value determined for the category, and the associated weight determined for the category.

Audio input module 6A, as shown in the example of FIG. 2, includes monitoring and execution module 38. When active, monitoring and execution module 38 may be operable by processors 20 to process indications of audio input to determine whether the audio input includes a predetermined audio command. In some examples, monitoring and execution module 38 may perform one or more actions corresponding to a predetermined audio command included in received audio input. For instance, one or more of input devices 22 and/or sensors 26 may represent a low power or ultra-low power audio microphone capable of receiving continuous audio input. Monitoring and execution module 38 may receive the audio input from the microphone, and may process the audio input. In some examples, monitoring and execution module 38 may process the audio input by performing one or more speech-to-text transformations to obtain textual data corresponding to the received audio input. In other examples, monitoring and execution module 38 may perform other audio analysis to recognize and identify speech, such as performing frequency analysis to identify tonal characteristics or other sonic identifiers present in the audio input.

Monitoring and execution module 38 may use the processed input to determine whether or not a predetermined audio command is included in at least a portion of the received audio input. For instance, monitoring and execution module 38 may compare the processed audio input to a set of indications (e.g., text, tonal characteristics, or other sonic identifiers) corresponding to predetermined audio commands. If monitoring and execution module 38 determines that the audio input includes a predetermined audio command, monitoring and execution module 38 may, in some examples, perform the associated action.

In accordance with the techniques described herein, audio input module 6A (e.g., negotiation module 40) may, upon execution by processors 20, designate or assist in designating a particular computing device from a plurality of computing devices to monitor for and/or process audio input. In the example of FIG. 2, for instance, computing device 2A may be a smartphone, computing device 2B may be a desktop computer, and computing device 2C may be a smartwatch. Computing devices 2A, 2B, and 2C may be associated or otherwise communicatively coupled with one another. Negotiation module 40 may communicate with computing devices 2B and 2C to designate which of the three computing devices will monitor and process audio input to determine whether the audio input includes a predetermined audio command.

In some examples, audio input module 6A may cause negotiation module 40 to designate or assist in designating the particular computing device to monitor for and/or process audio input in response to receiving an indication of computing devices 2B and 2C. Audio input module 6A may receive information indicating the existence of and/or association with computing devices 2B and 2C from communication units 4A, sensors 26, application modules 34, and/or other sources. As one example, audio input module 6A may receive an indication that computing devices 2B and 2C are physically proximate to computing device 2A. In some examples, audio input module 6A may receive an indication that computing devices 2B and 2C are using a wired or wireless network (e.g., a network provided by the user's wireless router) to which computing device 2A is connected. In some examples, computing device 2A may receive an indication that computing devices 2B and 2C are associated with a user account (e.g., an email account, a social network service account, etc.) with which computing device 2A is also associated. In other words, audio input module 6A may, in some examples, receive some indication that computing devices 2A, 2B, and 2C are associated in some manner.

In some examples, negotiation module 40 may (e.g., alone or in conjunction with negotiation modules of computing devices 2B and/or 2C) designate the particular computing device to monitor for and/or process audio input based at least in part on the context received from device context module 36. For instance, because the context of computing device 2A indicates that computing device 2A is at a home location of the user and that computing device 2A is currently not moving, negotiation module 40 may be less likely to designate computing device 2A as the particular computing device. This may reflect the fact that, based on the context, it is likely the user is not carrying his or her smartphone around the house with him or her, and instead has set the smartphone down somewhere. In this example, negotiation module 40 may designate computing device 2B (e.g., the desktop computer) or computing device 2C (e.g., the smartwatch) as the particular computing device to monitor for and/or process audio input.

In some examples, negotiation module 40 may receive an indication of a determined context of computing device 2B and 2C. For instance, computing devices 2B and 2C may each include modules analogous to modules 36, 6A, 38, and/or 40 of computing device 2A. In such instance, the respective device context module of computing devices 2B and/or 2C may send an indication of a respective context to the respective audio input module, and the respective negotiation module may send an indication of the respective context to negotiation module 40 of computing device 2A. In the example of FIG. 2, the respective contexts of the smartwatch and desktop computer may indicate the device type of the respective computing device. The respective context may also indicate that neither the smartwatch nor the desktop computer is moving. Furthermore, the respective contexts of the smartwatch and desktop computer may indicate positions (e.g., GPS positions) that are within a threshold distance of each other (e.g., within 0.5 meters, within 3 feet, or other distance) but that are not within the threshold distance of computing device 2A.

Based at least in part on the respective contexts of computing devices 2A, 2B, and 2C, negotiation module 40 may (e.g., alone or in conjunction with a negotiation module of computing device 2B and/or a negotiation module of computing device 2C) designate the particular computing device to monitor for audio input and/or process audio input. In the example of FIG. 2, for instance, negotiation module 40 may, based on the contexts, designate computing device 2B (the desktop computer) as the particular computing device. This may reflect the fact that the user is likely using computing device 2B (e.g., because the smartwatch is near the desktop computer) and computing device 2A is likely not near the user (e.g., because the smartwatch and desktop computer are not near the smartphone). Furthermore, the designation of computing device 2B to monitor for and/or process audio input may reflect the fact that computing device 2B is likely not a battery-powered device. That is, computing device 2B is less likely than computing devices 2A and 2C to have limited available power.

As another example, negotiation module 40 may designate the particular computing device to monitor for audio input and/or process audio input based additionally or alternatively on an audio input quality associated with one or more of computing devices 2A, 2B, and 2C. For instance, negotiation module 40 may compare the audio input quality for each of computing devices 2A, 2B, and 2C, and designate the computing device associated with the best audio input quality as the particular computing device to monitor for and process audio input. In order to compare audio input qualities, negotiation module 40 may obtain audio input from one or more of sensors 26 and determine a level of audio input quality for the audio input. In such examples, negotiation module 40 may determine the strength of the audio input (e.g., in decibels), a ratio between speech included in the audio input and other sound (e.g., background noise or static), or other measurements. In some examples, negotiation module 40 may send an indication of the determine audio input quality for computing device 2A to one or more of computing devices 2B and 2C. Negotiation module 40 may also receive indications of audio input quality determined by computing devices 2B and/or 2C. Negotiation module 40 may then compare the audio input quality of computing device 2A to that of computing devices 2B and 2C to determine which of the computing devices is associated with the best audio input quality. Negotiation module 40 may designate, as the particular computing device to monitor for and/or process audio input, the computing device that is associated with the best audio input quality (e.g., the highest audio strength, the best speech to noise ratio, etc.).

As another example, negotiation module 40 may designate the particular computing device to monitor for audio input and/or process audio input based additionally or alternatively on a configured hierarchy of device types. For instance, the configured hierarchy may rank a desktop computer higher than a smartphone or a smartwatch and thus negotiation module 40 may designate computing device 2B as the particular computing device. That is, based on the hierarchy, negotiation module 40 may be more likely to designate a desktop computer as the particular computing device, if available, and less likely to designate a smartphone or smartwatch. This may reflect the fact that a desktop computer may have more resources (e.g., power, processing power, etc.) for monitoring for audio input and/or processing audio input. In some examples, each negotiation module of computing devices 2 may operate independently to determine which of computing devices 2 is of a type having the highest device priority level and thus which computing device to designate to monitor for and/or process audio input. In some examples, the negotiation modules of computing devices 2 may communicate with one another (e.g., via communication units 4) to determine, cooperatively, which computing device is of a type having the highest device priority level.

In some examples, negotiation module 40 may designate the particular computing device to monitor for audio input and/or process audio input based on a hierarchy or ranked list of device types and on a context of one or more of computing devices 2. For instance, computing device 2A may be configured with multiple configured hierarchies. A first hierarchy may rank a desktop computer higher than a smartphone or smartwatch, but only if some contextual criteria are satisfied. If the context of a desktop computer indicates that the desktop computer includes a microphone or other audio input device, the criteria may be satisfied, and negotiation module 40 may designate the desktop computer based on the first hierarchy. If the context of the desktop computer indicates that the desktop computer does not include a microphone, the criteria may not be satisfied, and negotiation module 40 may designate the particular computing device based on a different configured hierarchy or in some other way.

In the example of FIG. 2, negotiation module 40 may send an indication of the designation (e.g., via communication units 4A) to the respective negotiation module of computing devices 2B and 2C. That is, a computing device that designates (or computing devices that designate) a particular computing device from a plurality of computing devices to monitor for and/or process audio input may, in some examples, send indications of the designation to others of the plurality of computing devices. In some examples, the computing device that is designated as the particular computing device may send indications of the designation. That is, in some examples, responsive to being designated as the particular computing device, the particular computing device may send an at least an indication of the designation to each respective computing device from the plurality of computing devices other than the particular computing device. In this way, each of the plurality of computing devices may receive an indication of the designation.

Negotiation module 40, in the example of FIG. 2, may also be operable by processors 20 to temporarily deactivate a module for monitoring and/or processing audio input. For instance, responsive to designating a computing device other than computing device 2A as the particular device to monitor for and process audio input, negotiation module 40 may temporarily deactivate monitoring and execution module 38. In a similar fashion, responsive to receiving an indication that one or more others of computing devices 2 have designated one of computing devices 2 other than computing device 2A as the particular computing device, negotiation module 40 may temporarily deactivate monitoring and execution module 38. For example, computing devices 2 may each compare a device identifier included in the indication to their own device identifiers. Responsive to determining that the device identifiers do not match, the respective computing devices (e.g., negotiation modules) may each determine that the designated computing device is a different computing device, and may deactivate a respective module for monitoring for and/or processing audio input (e.g., monitoring and execution module 38). That is, negotiation module 40 may, in some examples, receive an instruction from one or more others of computing devices 2 that causes negotiation module 40 to temporarily deactivate monitoring and execution module 38. When deactivated, monitoring and execution module 38 may not monitor for audio input or process audio input to determine whether the audio input includes a predetermined audio command. That is, when deactivated, monitoring and execution module 38 may temporarily cease monitoring for predetermined audio commands. Responsive to determining that the device identifier included in the indication does match its device identifier, a computing device may not deactivate its module for monitoring and/or processing audio input, but rather will continue to monitor for audio input and/or process audio input.

In some examples, computing device 2A may designate computing device 2A as the particular computing device to monitor for and/or process audio input and/or receive an indication that one or more others of computing devices 2 have designated computing device 2A as the particular computing device. Responsive to the designation of computing device 2A as the particular computing device to monitor for audio input and process audio input, monitoring and execution module 38 may continue to monitor the environment for audio input and process the audio input to determine whether the audio input includes a predetermined audio command.

Subsequent to the designation of computing device 2A as the particular computing device, monitoring and execution module 38 may receive an indication of audio input (e.g., from one of sensors 26). Monitoring and execution module 38 may process the audio input and compare the processed input to a set of indications corresponding to predetermined audio commands to determine whether the audio input includes a predetermined audio command. In some examples, the set of indications corresponding to predetermined audio commands may represent predetermined audio commands to which computing device 2A is configured to respond. In some such examples, if monitoring and execution module 38 determines that none of the represented predetermined audio commands is included in the audio input, monitoring and execution module 38 may cause audio input module 6A to send (e.g., via communications unit 4A), to others of computing devices 2, the processed input. That is, in some examples the particular computing device may process audio input to determine whether the audio input includes a predetermined audio command to which the particular computing device is configured to respond and, if the audio input does not include a predetermined audio command to which the particular computing device is configured to respond, the particular computing device may send the processed input to others of the plurality of computing devices.

In some examples, the particular computing device may determine whether the audio input includes a predetermined audio command to which any of the plurality of computing devices is configured to respond. For instance, computing device 2A may receive an indication of predetermined audio commands to which others of computing devices 2 are configured to respond. As another example, computing device 2A may receive an indication of a device type for others of computing devices 2 and computing device 2A may be configured with a list associating various predetermined audio commands with various device types. That is, the particular computing device may be operable to determine whether the audio input includes a predetermined audio command to which the particular computing device may not be configured to respond, but to which another computing device is configured to respond.

If monitoring and execution module 38 determines that the audio input includes a predetermined audio command, monitoring and execution module 38 may, in some examples, cause computing device 2A to perform the action or operation associated with the received predetermined audio command. For instance, if monitoring and execution module 38 determines that the audio input includes a predetermined audio command to which computing device 2A is configured to respond, monitoring and execution module 38 may cause computing device 2A to perform one or more actions that are associated with the received predetermined audio command. In some examples, if monitoring and execution module 38 determines that the audio input includes a predetermined audio command to which another of computing devices 2 is configured to respond, monitoring and execution module 38 may cause audio input module 6A to send, to the other computing device, an indication of the included predetermined audio command.

For instance, monitoring and execution module 38 may receive an indication of audio input and process the audio input. In some examples, the predetermined audio command may indicate that additional audio input that indicates a command will follow the predetermined audio command, and in other examples the predetermined audio command may itself represent a command.

In one example, monitoring and execution module 38 may determine that the audio input includes the predetermined audio command "what's the time," to which computing device 2C is configured to respond (but to which computing device 2A may not configured to respond). Responsive to determining that the predetermined audio command "what's the time" has been used, monitoring and execution module 38 may send an indication of the received predetermined audio command to computing device 2C, thereby causing computing device 2C to perform one or more actions or operations corresponding to the predetermined audio command, such as providing an audio output of the current time. For instance, responsive to receiving the indication of the predetermined audio command, computing device 2C may send information to an application module (e.g., a clock or alarm clock application) instructing the application module to output the audio. In this way, computing device 2A may designate a particular computing device from a plurality of computing devices to monitor for and/or process audio input and, if not designated as the particular computing device, computing device 2A may temporarily cease monitoring for and/or processing of audio input. If designated as the particular computing device, computing device 2A may not cease monitoring for and/or processing of audio input and may monitor for and receive audio input. Computing device 2A may process the audio input to determine whether the audio input includes a predetermined audio command and, if the input includes a predetermined audio command, computing device 2A may perform actions associated with the predetermined audio command and/or send an indication of the included predetermined audio command to one or more other computing devices from the plurality of computing devices.

Figure 3:
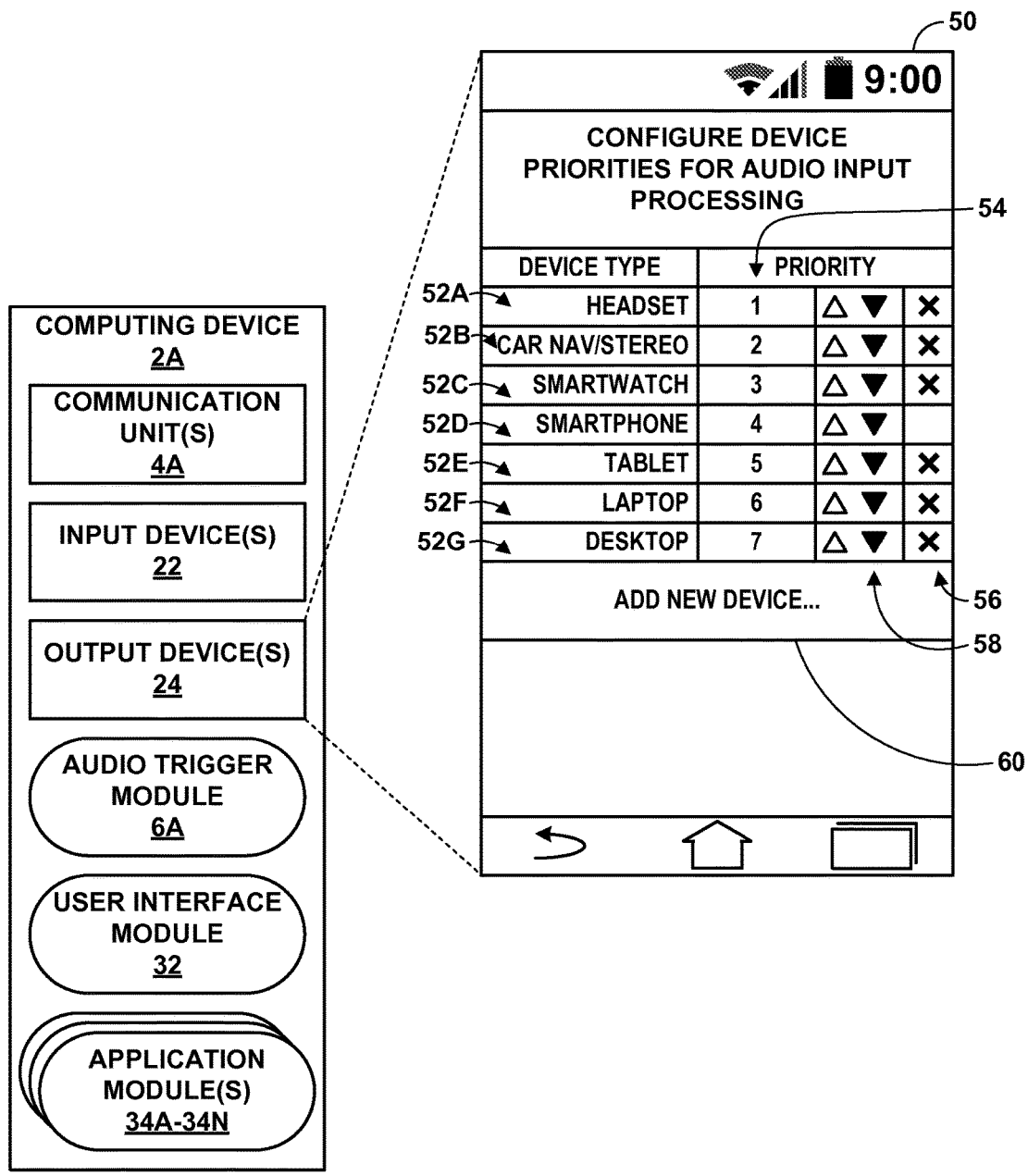
FIG. 3 is a conceptual diagram illustrating one example of a computing device configured to process audio input and an example graphical user interface (GUI) for configuring device type priorities, in accordance with one or more techniques of the present disclosure.

FIG. 3 is a conceptual diagram illustrating one example of a computing device 2A configured to monitor for and/or process audio input and an example graphical user interface (GUI) 50 for configuring device type priorities, in accordance with one or more techniques of the present disclosure. For purposes of illustration only, the example of FIG. 3 is described below within the context of FIGS. 1 and 2.

In the example of FIG. 3, GUI 50 may be output for display by one of application modules 34 at one or more of output devices 24. For instance, a user configuration or settings application (e.g., application module 34C) may send information to UI module 32 to be output. UI module 32 may receive the data and cause a presence-sensitive display (e.g., output device 24A) to display GUI 50.

GUI 50, as shown in the example of FIG. 3, includes a list of ranked device type entries 52A-52G (collectively, device type entries 52). Each of device type entries 52 may correspond to a type of device. For instance, device type entry 52A may correspond to a defined device type that includes devices such as Bluetooth headsets or other head-mounted, wearable computing devices. Device type entry 52A may, in some examples, correspond to a defined device type that includes in-vehicle navigation systems and/or stereo systems, such as computing device 2B. In some examples, device type entry 52C may correspond to a defined device type that includes any computing devices worn on a user's wrist, such as smartwatches. In some examples, a device type for a device may be user defined by interaction with computing device 2A (e.g., using application module 34C) and/or by interaction with each respective device. In some examples, device types may be preconfigured (e.g., by a manufacturer or retailer of the respective computing device).

In the example of FIG. 3, GUI 50 may represent the list of ranked device types after device type entries 52A-52C and 52E-52G have been added (e.g., by the user of computing device 2A, prepopulated by a device manufacturer or retailer, or in some other way). That is, in some examples, a list or ranked device types on a computing device may initially only include a device type entry for the computing device. In some examples, device type entries may be automatically added as the computing device communicates with new device types (e.g., when pairing via short range communication methods, when receiving an indication of a user's other devices, or in other ways). In some examples, device type entries may additionally or alternatively be manually added. For instance, in the example of FIG. 3, a user of computing device 2A may select graphical element 60 to cause computing device 2A to display a GUI that allows the user to add a new device type entry.

GUI 50, as shown in the example of FIG. 3, includes priority levels 54. Priority levels 54 may represent the relative priority of each of device type entries 52. For instance, device type entry 52A has a relative priority level of 1 (which may indicate a highest priority). Device type entry 52F has a relative priority level of 7. In some examples, a lower priority level may indicate that the respective device type entry indicates the type of devices that are more likely to be designated as the particular computing device to monitor for and/or process audio input in accordance with the techniques described herein. That is, priority levels 54 may, in some examples, represent a ranked ordering of how different device types may be prioritized for designation as the particular computing device to monitor for and/or process audio input. In the example of FIG. 3, for instance, audio input module 6A may designate a computing device having a "headset" device type, if included in the plurality of computing devices and/or detected by computing device 2A, as the particular computing device. If no computing device having the "headset" device type is included in the plurality of computing devices, then audio input module 6A may designate an in-vehicle stereo/navigation system, if included in the plurality of computing devices and/or detected by computing device 2A, as the particular computing device, and so on. In this way, audio input module 6A may use priority levels 54 for device type entries 52 in designating the particular computing device to monitor for and/or process indications of audio input.

In some examples, the list of ranked device types may be user configurable. In the example of FIG. 3, for instance, GUI 50 includes removal elements 56 and arrows 58. Removal elements 56 may be user-selectable to allow the user of computing device 2A to remove one or more of device type entries 52A-52C and/or 52E-52G from the list. In the example of FIG. 3, device type entry 52D may not be removable, because computing device 2A corresponds to the "smartphone" device type. That is, in some examples, a device type entry corresponding to the computing device at which a list of ranked device types is being modified may not be removable. In other examples, only certain device type entries may be removable, all device type entries may be removable, or no device type entries may be removable.

Arrows 58 may, in the example of FIG. 3, be user-selectable elements that cause computing device 2A to modify one of priority levels 54 for a corresponding device type entry. For instance, selecting the up arrow (shown as un-filled in the example of FIG. 3) for device type entry 52D may cause computing device 2A to decrease the priority level of device type entry 52D from 4 to 3, and increase the priority level of device type entry 52C from 3 to 4. As a result, computing devices having a "smartphone" device type may be more likely to be designated as the particular computing device than computing devices having a "smartwatch" device type.

In some examples, the list of ranked device type entries shown in GUI 50 may be stored at computing device 2A. That is, when the list is modified, the changes may be saved at computing device 2A (e.g., at storage devices 28). In such instance, audio input module 6A of computing device 2A may designate the particular computing device to monitor for and/or process audio input. In some examples, the list of ranked device type entries shown in GUI 50 may be stored at another of computing devices 2 (e.g., computing device 2B, computing device 2C), at an external computing device (e.g., a central server or cloud computing system) or at multiple computing devices. That is, when the list is modified, the changes may be sent (e.g., via communication units 4A) from computing device 2A to one or more other computing devices. For instance, in the example of FIG. 3, the list of ranked device type entries 52 may be stored by computing device 2A and be sent by computing device 2A to each of computing devices 2B and 2C for storage. In such instance, each of computing devices 2A, 2B, and 2C may independently designate the particular computing device to monitor for and/or process audio input. That is, because each of computing devices 2 includes the list of ranked device types, each of computing devices 2 may be operable to use the list in designating the particular computing device and thus each designate the correct computing device as the particular computing device.

In some examples, each of device type entries 52 may be associated with a corresponding priority level that is different from every other device type entry. That is, priority levels 54 may be unique. In some examples, two or more of device type entries 52 may be associated with corresponding priority levels that are the same. Additionally or alternatively, in some examples, two computing devices that are associated with the same device type may be included in the plurality of computing devices. In such instance, one or more of computing devices 2 may designate the particular computing device to monitor for and/or process audio input based on an arbitration process, based on a round-robin selection, based on random selection, based on the current context of each of the computing devices, or in other ways. For instance, if computing devices 2 includes two computing devices having the same priority level, the computing device that was most recently used by the user may be designated as the particular computing device. Thus, given the list of ranked device type entries shown in GUI 50, if the user has two computing devices having a "headset" device type, the headset that has more recently been used by the user may be designated as the particular computing device to monitor for and/or process audio input.

By using a list of ranked device types, one or more computing devices may designate a particular computing device from a plurality of computing devices to monitor for and/or process audio input. Thereafter, each of the plurality of computing devices other than the particular computing device may temporarily cease monitoring for and/or processing indications of audio input. The designated computing device may receive audio input, and process the audio input to determine whether the audio input includes a predetermined audio command. The list of ranked device types described in the example of FIG. 3 represents only one example criterion on which designation of the particular computing device may be made. Various alternative or additional criteria may be used in various examples, as described herein.

Figure 4:
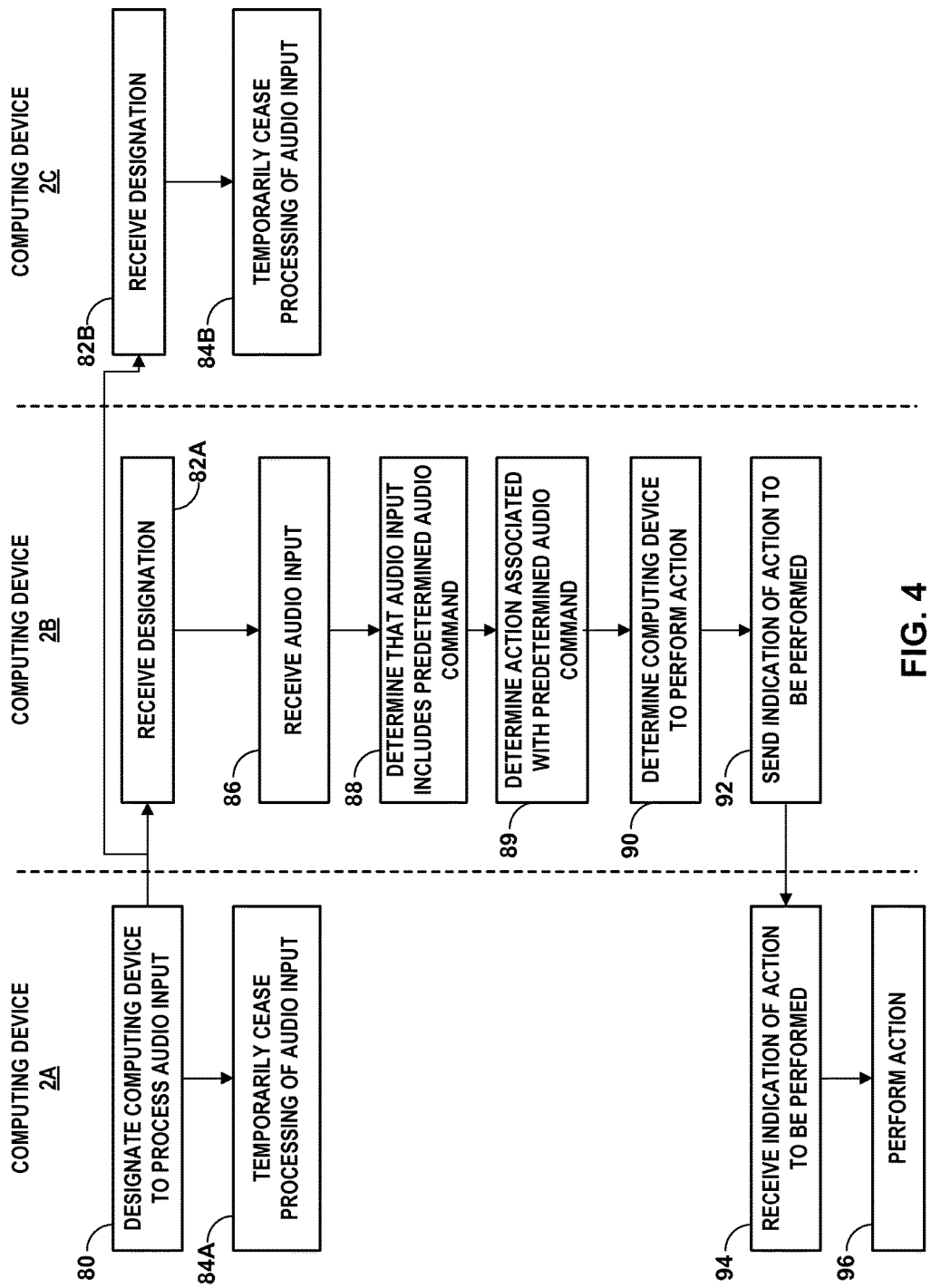
FIG. 4 is a flow diagram illustrating example operations of computing devices configured to process audio input, in accordance with one or more techniques of the present disclosure.

FIG. 4 is a flow diagram illustrating example operations of computing devices configured to monitor for and/or process audio input, in accordance with one or more techniques of the present disclosure. For purposes of illustration only, the example operations of FIG. 4 are described below within the context of FIGS. 1 and 2. In the example of FIG. 4, a plurality of computing devices (e.g., computing devices 2) may include computing device 2A, computing device 2B, and computing device 2C. Computing devices 2A-2C may be associated with one another. As one example, each of computing devices 2A-2C may be associated with the same user. As another example, each of computing devices 2A-2C may be in physical proximity to one another. As another example, each of computing devices 2A-2C may be communicatively connected to one another via one or more wired or wireless connections.

In the example of FIG. 4, one or more of computing devices 2 may designate one of computing devices 2 to monitor for audio input and/or process audio input (80). For instance, negotiation module 40 of computing device 2A may designate computing device 2B to monitor for and/or process audio input. In various examples, the computing device to monitor for and/or process audio input may be designated based at least in part on a current context of one or more of computing devices 2, based at least in part on the device types associated with each of computing devices 2, and/or on various other criteria.

Computing devices 2B and 2C (e.g., at respective negotiation modules) may, in the example of FIG. 4, receive an indication of the designated particular computing device to monitor for audio input and/or process audio input (82A, 82B). In some examples, computing devices 2B and 2C may receive the indication from computing device 2A, such as when computing devices 2 are communicatively connected via one or more communication links. In some examples, computing devices 2B and 2C may receive the indication from another computing device, such as a remote device (e.g., a server system, "cloud computing" system, etc.) with which each of computing devices 2 is configured to communicate.

In the example of FIG. 4, responsive to the designation of computing device 2B to monitor for and/or process indications of audio input, computing devices 2A and 2C may each deactivate a respective module for monitoring for and/or processing audio input (84A, 84B). For example, computing devices 2A, 2B, and 2C may each compare a device identifier included in the indication to their own device identifiers. Responsive to determining that the device identifiers do not match (as in the case of computing devices 2A and 2C), the respective computing devices may each determine that the designated computing device is a different computing device, and can deactivate a respective module for monitoring for and/or processing audio input. In this way, the respective computing devices may temporarily cease processing of audio input.

Responsive to determining that the device identifier included in the indication does match its device identifier (i.e., that computing device 2B is the computing device designated to monitor for and/or process audio input), computing device 2B will not deactivate its module for monitoring for and/or processing audio input, but rather will continue to monitor for audio input and/or process audio input. That is, computing devices from the plurality of computing devices other than the designated computing device may stop monitoring for predetermined audio commands while the designated computing device may continue to monitor for predetermined audio commands. For instance, computing device 2A may deactivate monitoring and execution module 38, and computing device 2C may deactivate an analogous monitoring and execution module of computing device 2C.

Computing device 2B, in the example of FIG. 4, may receive audio input (86). That is, because computing device 2B did not deactivate its respective module for monitoring for and/or processing audio input, the respective module of computing device 2B (e.g., a monitoring and execution module) may receive an indication of audio input. Computing device 2B may process the audio input and determine that the audio input includes a predetermined audio command (88). For instance, computing device 2B may determine that the audio input includes the predetermined audio command "make a call."

Computing device 2B may, in the example of FIG. 4, determine an action associated with the predetermined audio command that is included in the audio input (89). For instance, computing device 2B may determine an action based on the predetermined audio command itself and/or on subsequent audio input. As one example of an action determined based on the predetermined audio command itself, the predetermined audio command may be the phrase "go silent" and the action may be to enter a silent mode. That is, the action (e.g., enter silent mode) is based on the predetermined audio command (e.g., "go silent"). As an example of an action determined based on the predetermined audio command and a subsequent audio input, the predetermined audio command may be the word "play" and the subsequent audio input may be the title of a song, TV show, or other media content item. In such instance, the action (e.g., play the specified media item) may be based on both the predetermined audio command and the subsequent audio input. In the example of FIG. 4, computing device 2B may determine an action to execute a telephone application, based on the predetermined audio command, "make a call."

In the example of FIG. 4, computing device 2B may determine a computing device to perform the action corresponding to the predetermined audio command included in the audio input (90). That is, based at least in part on the predetermined audio command and/or an associated action, computing device 2B may determine which of computing devices 2 should perform the action. In some examples, determining a computing device to perform an action associated with a predetermined audio command may be based on a current context of one or more of computing devices 2. For instance, computing device 2B may determine which of computing devices 2 is operable to perform the corresponding action, respective power sources of each of computing devices 2, or other contextual information. In some examples, determining the computing device to perform the action may be based on additional or alternative criteria. In the example of FIG. 4, computing device 2B may determine that computing device 2A (e.g., the smartphone) will perform the action associated with the predetermined audio command (e.g., "make a call").

Computing device 2B may, in the example of FIG. 4, send an indication of the action to be performed to computing device 2A (92). That is, after determining which computing device will perform an action, the designated computing device may send an indication of the action to the determined computing device. The determined computing device may receive the indication of the action to be performed (94) and may perform the action (96). In this way, a computing device designated to monitor audio input and/or process indications of audio input does not have to be the computing device to perform actions associated with predetermined audio commands that are included in received audio input. That is, a computing device that monitors for predetermined audio commands may be operable in accordance with the techniques described herein to cause another computing device from the plurality of computing devices to perform actions corresponding to a received command.

Figure 5:
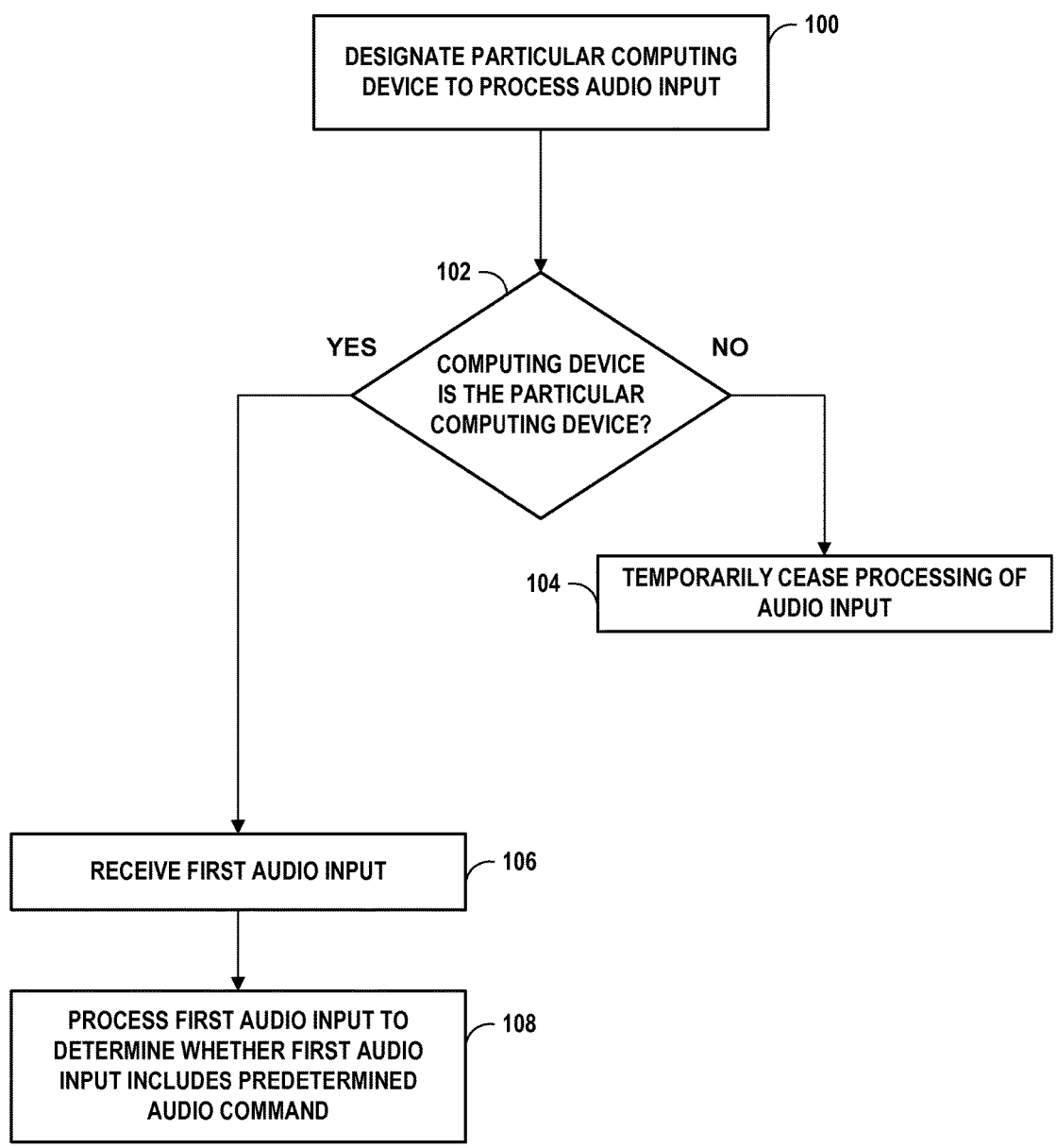
FIG. 5 is a flow diagram illustrating example operations of a computing device configured to process audio input, in accordance with one or more techniques of the present disclosure.

FIG. 5 is a flow diagram illustrating example operations of a computing device configured to monitor for and/or process audio input, in accordance with one or more techniques of the present disclosure. For purposes of illustration only, the example operations of FIG. 5 are described below within the context of FIGS. 1 and 2. In the example of FIG. 5, computing device 2A may be one of a plurality of computing devices (e.g., computing devices 2). Each respective computing device from the plurality of computing devices may be configured to process audio input to determine whether the audio input includes a predetermined audio command.

Computing device 2A (e.g., negotiation module 40 of audio input module 6A) may, in the example of FIG. 5, designate a particular computing device from a plurality of computing devices to process audio input (100). In some examples, computing device 2A may perform the designation alone. In some examples, computing device 2A may communicate with others of computing devices 2 to perform the designation. In some examples, two or more of computing devices 2 may independently perform the designation.

Responsive to designating another computing device from the plurality of computing devices as the particular computing device ("NO" branch of operation 102), computing device 2A may, in the example of FIG. 5, temporarily cease processing of audio input (104). That is, if computing device 2A determines that it was not designated as the particular computing device, computing device 2A may temporarily deactivate audio input module 6A. In other words, if the particular computing device is not computing device 2A, computing device 2A may cease processing of audio input. In some examples, computing device 2A may additionally send an instruction to each of computing devices 2 other than the particular computing device that causes the computing devices to temporarily cease processing of audio input In the example of FIG. 5, responsive to designating computing device 2A as the particular computing device ("YES" branch of operation 102), computing device 2A may receive first audio input (106). That is, computing device 2A may determine that it is the designated particular computing device. In other words, if the particular computing device is computing device 2A, computing device 2A may receive first audio input. Computing device 2A may process the first audio input to determine whether the first audio input includes a predetermined audio command (108).

The example operations of FIG. 5 may further be described by one or more of the examples below.

EXAMPLE 1

A method comprising: designating, by a first computing device from a plurality of computing devices, a particular computing device from the plurality of computing devices to process audio input; if the particular computing device is not the first computing device, ceasing, by the first computing device, processing of audio input; and if the particular computing device is the first computing device: receiving, by the first computing device, first audio input; and processing, by the first computing device, the first audio input to determine whether the first audio input includes a predetermined audio command.

EXAMPLE 2

The method of example 1, further comprising: if the particular computing device is the first computing device, sending, by the first computing device and to a second computing device from the plurality of computing devices, an instruction to cause the second computing device to cease processing of audio input.

EXAMPLE 3

The method of any of examples 1-2, further comprising: determining, by the first computing device, a current context of a second computing device from the plurality of computing devices, wherein designating the particular computing device to process audio input is based at least in part on the current context of the second computing device.

EXAMPLE 4

The method of example 3, wherein determining the current context of the second computing device comprises determining one or more of: a location of the second computing device, a current time as defined by the second computing device, one or more applications installed at the second computing device, one or more applications currently executing at the second computing device, one or more networks available to the second computing device, one or more other computing devices in proximity to the second computing device an operating mode of the second computing device, an ambient temperature of the location of the second computing device, an ambient noise level of the location of the second computing device, an ambient light level of the location of the second computing device, a movement of the second computing device, a name of a user of the second computing device, a user identification (UID) of the user, a social media network service account associated with the user, one or more calendars associated with the user, or one or more social relationships of the user.

EXAMPLE 5

The method of any of examples 1-4, further comprising: responsive to determining that the first audio input includes the predetermined audio command, determining, by the first computing device, an action associated with the predetermined audio command; and determining, by the first computing device and based at least in part on the action associated with the predetermined audio command, a second computing device to perform the action.

EXAMPLE 6

The method of example 5, wherein the first computing device is different from the second computing device, the method further comprising: sending, by the first computing device and to the second computing device, an indication of the action.

EXAMPLE 7

The method of any of examples 1-6, further comprising determining, by the first computing device, an audio input quality associated with a second computing device from the plurality of computing devices, wherein designating the particular computing device to process audio input is based at least in part on the audio input quality associated with the second computing device.

EXAMPLE 8

The method of any of examples 1-7, wherein designating the particular computing device to process audio input comprises designating the particular computing device to process audio input based at least in part on a configured hierarchy of two or more device types.

EXAMPLE 9

The method of example 8, wherein the configured hierarchy of two or more device types is configured based at least in part on user input.

EXAMPLE 10

The method of any of examples 1-9, wherein designating the particular computing device to process audio input comprises: receiving, by the first computing device and from a second computing device, an indication of a device type associated with the second computing device.

EXAMPLE 11

A computing device comprising: at least one processor; and at least one module operable by the at least one processor to: designate a particular computing device from a plurality of computing devices to process audio input, wherein the computing device comprises a first computing device from the plurality of computing devices, if the particular computing device is not the first computing device, cease processing of audio input, and if the particular computing device is the first computing device: receive first audio input; and process the first audio input to determine whether the first audio input includes a predetermined audio command.

EXAMPLE 12

The computing device of example 11, wherein the at least one module operable to designate the particular computing device to process audio input is operable by the at least one processor to: receive, from a second computing device from the plurality of computing devices, an indication of a device type associated with the second computing device, and designate the particular computing device to process audio input based at least in part on the device type associated with the second computing device.

EXAMPLE 13

The computing device of example 11, wherein the at least one module is further operable by the at least one processor to determine a current context of a second computing device from the plurality of computing devices, wherein the at least one module operable to designate the particular computing device to process audio input is operable by the at least one processor to designate the particular computing device based at least in part on the current context of the second computing device.

EXAMPLE 14

The computing device of example 13, wherein the at least one module operable to determine the current context of the second computing device is operable by the at least one processor to determine one or more of: a location of the second computing device, a current time as defined by the second computing device, one or more applications installed at the second computing device, one or more applications currently executing at the second computing device, one or more networks available to the second computing device, one or more other computing devices in proximity to the second computing device, an operating mode of the second computing device, an ambient temperature of the location of the second computing device, an ambient noise level of the location of the second computing device, an ambient light level of the location of the second computing device, a movement of the second computing device, a name of a user of the second computing device, a user identification (UID) of the user, a social media network service account associated with the user, one or more calendars associated with the user, or one or more social relationships of the user.

EXAMPLE 15

The computing device of example 11, wherein the at least one module is further operable by the at least one processor to: responsive to determining that the first audio input includes the predetermined audio command, determine an action associated with the predetermined audio input; and determine, based at least in part on the action associated with the predetermined audio command, a second computing device to perform the action.

EXAMPLE 16

The computing device of example 15, wherein the first computing device is different from the second computing device, and wherein the at least one module is further operable by the at least one processor to: send, to the second computing device, an indication of the action.

EXAMPLE 17

The computing device of example 11, wherein the at least one module operable to designate the particular computing device to process audio input is operable by the at least one processor to designate the particular computing device to process audio input based at least in part on a configured hierarchy of two or more device types.

EXAMPLE 18

The computing device of any of examples 11-17, further comprising means for performing any of the method of examples 1-10.

EXAMPLE 19

A computer-readable storage medium encoded with instructions that, when executed, cause at least one processor of a first computing device to: receive, from a second computing device, a designation of a particular computing device from a plurality of computing devices to process audio input; if the particular computing device is not the first computing device, cease processing of audio input; and if the particular computing device is the first computing device: receive first audio input, and process the first audio input to determine whether the first audio input includes the predetermined audio command.

EXAMPLE 20

The computer-readable storage medium of example 19, further encoded with instructions that, when executed, cause the at least one processor to: determine a current context of the first computing device, and send, to the second computing device, an indication of the current context of the first computing device, wherein receiving the designation of the particular computing device comprises receiving the designation responsive to sending the indication of the current context.

EXAMPLE 21

The computer-readable storage medium of example 19, further encoded with instructions that, when executed, cause the at least one processor to: receive, from a third computing device from the plurality of computing devices, an indication of a device type associated with the third computing device, and send, to the second computing device, the indication of the device type associated with the third computing device, wherein receiving the designation of the particular computing device comprises receiving the designation responsive to sending the indication of the device type associated with the third computing device.

EXAMPLE 22

The computer-readable storage medium of any of examples 19-21, further encoded with instructions that, when executed, cause the at least one processor to perform the method recited by any of examples 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a first computing device of a plurality of computing devices in physical proximity to one another, a spoken audio input that is also received by one or more additional computing devices of the plurality of computing devices;
   determining, by the first computing device and based at least in part on information received from the one or more additional computing devices, whether the first computing device should perform speech recognition on the spoken audio input; and responsive to determining that the first computing device should perform speech recognition on the spoken audio input:

sending, by the first computing device and to at least a second computing device from the plurality of computing devices, a command to temporarily refrain from performing speech recognition;

performing, by the first computing device, speech recognition on the spoken audio input;

determining, by the first computing device, based on performing speech recognition on the spoken audio input, whether the spoken audio input includes a predetermined spoken audio command; and responsive to determining that the spoken audio input includes the predetermined spoken audio command, executing, by the first computing device, an action associated with the predetermined spoken audio command.

2. The method of claim 1, further comprising:
determining, by the first computing device, a current context of the first computing device,
wherein determining whether the first computing device should perform speech recognition on the spoken audio input is further based on the current context of the first computing device.

3. The method of claim 2, wherein determining the current context of the first computing device comprises determining one or more of: a location of the first computing device, a current time as defined by the first computing device, one or more applications installed at the sec-end first computing device, one or more applications currently executing at the first computing device, one or more networks available to the first computing device, one or more other computing devices in proximity to the first computing device, an operating mode of the first computing device, an ambient temperature of the location of the first computing device, an ambient noise level of the location of the first computing device, an ambient light level of the location of the first computing device, a movement of the first computing device, a name of a user of the first computing device, a user identification (UID) of the user of the first computing device, a social media network service account associated with the user of the first computing device, one or more calendars associated with the user, or one or more social relationships of the user of the first computing device.

4. The method of claim 1,
wherein the information received from the one or more additional computing devices includes an indication of an audio input quality associated with a second computing device from one or more additional computing devices, and
wherein determining whether the first computing device should perform speech recognition on the spoken audio input is further based on the audio input quality associated with the second computing device and an audio input quality associated with the first computing device.

5. The method of claim 1,
wherein the information received from the one or more additional computing devices includes an indication of a type of a second computing device from the one or more additional computing devices, and
wherein determining whether the first computing device should perform speech recognition on the spoken audio input is further based on a configured hierarchy of two or more device types, a type of the first computing device, and the type of the second computing device.

6. The method of claim 5, wherein the configured hierarchy of two or more device types is configured based at least in part on user input.

7. A first computing device comprising:
at least one processor; and
at least one module operable by the at least one processor to:
receive a spoken audio input that is also received by one or more additional computing devices in physical proximity to the first computing device;
determine, based at least in part on information received from the one or more additional computing devices, whether the first computing device should perform speech recognition on the spoken audio input; and
responsive to determining that the first computing device should perform speech recognition on the spoken audio input:
send, to at least a second computing device from a plurality of computing devices, a command to temporarily refrain from performing speech recognition;
perform speech recognition on the spoken audio input;
determine, based on performing speech recognition on the spoken audio input, whether the spoken audio input includes a predetermined spoken audio command; and
responsive to determining that the spoken audio input includes the predetermined spoken audio command, execute an action associated with the predetermined spoken audio command.

8. The first computing device of claim 7,
wherein the information received from the one or more additional computing devices includes an indication of a type of a second computing device from the one or more additional computing devices, and
wherein the at least one module is operable by the at least one processor to
determine whether the first computing device should perform speech recognition on the spoken audio input further based on a configured hierarchy of two or more device types, a type of the first computing device, and the type of the second computing device.

9. The computing device of claim 7,
wherein the at least one module is further operable by the at least one processor to determine a current context of the first computing device, and
wherein the at least one module is operable by the at least one processor to determine whether the first computing device should perform speech recognition on the spoken audio input further based on the current context of the first computing device.

10. The computing device of claim 9, wherein the at least one module operable to determine the current context of the first computing device is operable by the at least one processor to determine one or more of: a location of the first computing device, a current time as defined by the first computing device, one or more applications installed at the first computing device, one or more applications currently executing at the first computing device, one or more networks available to the first computing device, one or more other computing devices in proximity to the first computing device, an operating mode of the first computing device, an ambient temperature of the location of the first computing device, an ambient noise level of the location of the first computing device, an ambient light level of the location of the first computing device, a movement of the first computing device, a name of a user of the first computing device, a user identification (UID) of the user of the first computing device, a social media network service account associated with the user of the first computing device, one or more calendars associated with the user of the first computing device, or one or more social relationships of the user of the first computing device.

11. A non-transitory computer-readable storage medium encoded with instructions that, when executed, cause at least one processor of a first computing device to:
  receive a spoken audio input that is also received by one or more additional computing devices in physical proximity to the first computing device;
  determine, based at least in part on information received from the one or more additional computing devices, whether the first computing device should perform speech recognition on the spoken audio input; and
  responsive to determining that the first computing device should perform speech recognition on the spoken audio input:
    send, to at least a second computing device from a plurality of computing devices, a command to temporarily refrain from performing speech recognition;
    perform speech recognition on the spoken audio input;
    determine, based on performing speech recognition on the spoken audio input, whether the first audio input includes a predetermined spoken audio command; and
    responsive to determining that the spoken audio input includes the predetermined spoken audio command, execute an action associated with the predetermined spoken audio command.

12. The non-transitory computer-readable storage medium of claim 11, further encoded with instructions that, when executed, cause the at least one processor to:
  determine a current context of the first computing device,
  wherein the instructions cause the at least one processor to determine whether the first computing device should perform speech recognition on the spoken audio input further based on the current context of the first computing device.

13. The non-transitory computer-readable storage medium of claim 11, wherein the information received from the one or more additional computing devices includes an indication of a type of a second computing device from the one or more additional computing devices, and
  wherein the instructions cause the at least one processor to
  determine whether the first computing device should perform speech recognition on the spoken audio input further based on a configured hierarchy of two or more device types, a type of the first computing device, and the type of the second computing device.

14. The non-transitory computer-readable storage medium of claim 11,
  wherein the information received from the one or more additional computing devices includes an indication of audio input quality associated with a second computing device from the one or more additional computing devices, and
  wherein the instructions cause the at least one processor to determine whether the first computing device should perform speech recognition on the spoken audio input further based on the audio input quality associated with the second computing device and an audio input quality associated with the first computing device.

15. The first computing device of claim 7,
  wherein the information received from the one or more additional computing devices includes an indication of an audio input quality associated with a second computing device from the one or more additional computing devices, and
  wherein the at least one module is operable by the at least one processor to determine whether the first computing device should perform speech recognition on the spoken audio input further based at least in part on the audio input quality associated with the second computing device and an audio input quality associated with the first computing device.

16. The first computing device of claim 7, wherein the at least one module is further operable by the at least one processor to:
  determine, based on a network connection of the first computing device and a respective network connection of the one or more additional computing devices, that the one or more additional computing devices are in proximity to the first computing device,
  wherein the at least one module is operable by the at least one processor to determine whether the first computing device should perform speech recognition on the spoken audio input in response to determining that the one or more additional computing devices are in proximity to the first computing device.

17. The first computing device of claim 7, wherein the at least one module is further operable by the at least one processor to:
  determine, based on a signal strength of a wireless communication between the first computing device and the one or more additional computing devices, that the one or more additional computing devices are in proximity to the first computing device,
  wherein the at least one module is operable by the at least one processor to determine whether the first computing device should perform speech recognition on the spoken audio input in response to determining that the one or more additional computing devices are in proximity to the first computing device.

18. The method of claim 1, further comprising:
  determining, by the first computing device, based on a network connection of the first computing device and a respective network connection of the one or more additional computing devices, that the one or more additional computing devices are in proximity to the first computing device,
  wherein determining whether the first computing device should perform speech recognition on the spoken audio input is responsive to determining that the one or more additional computing devices are in proximity to the first computing device.

19. The method of claim 1, further comprising:
  determining, by the first computing device, based on a signal strength of a wireless communication between the first computing device and the one or more additional computing devices, that the one or more additional computing devices are in proximity to the first computing device,
  wherein determining whether the first computing device should perform speech recognition on the spoken audio input is responsive to determining that the one or more additional computing devices are in proximity to the first computing device.

20. The method of claim 1, further comprising:

determining, by the first computing device, based on location information from a GPS sensor of the first computing device and location information from respective GPS sensors of the one or more additional computing devices, that the one or more additional computing devices are within a threshold distance of the first computing device; and responsive to determining that the one or more additional computing devices are within a threshold distance of the first computing device, determining, by the first computing device, that the one or more additional computing devices are in physical proximity to the first computing device, wherein determining whether the first computing device should perform speech recognition on the spoken audio input is responsive to determining that the one or more additional computing devices are in proximity to the first computing device.

\* \* \* \* \*